United States Patent
Ando et al.

(10) Patent No.: US 6,895,432 B2
(45) Date of Patent: May 17, 2005

(54) IP NETWORK SYSTEM HAVING UNAUTHORIZED INTRUSION SAFEGUARD FUNCTION

(75) Inventors: Tadanao Ando, Yokohama (JP); Atsuko Taguchi, Yokohama (JP); Tatsuo Kondou, Yokohama (JP); Hiroyuki Kida, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 679 days.

(21) Appl. No.: 09/848,891

(22) Filed: May 4, 2001

(65) Prior Publication Data

US 2002/0078202 A1 Jun. 20, 2002

(30) Foreign Application Priority Data

Dec. 15, 2000 (JP) ........................................ 2000-382597

(51) Int. Cl.[7] ............................ G06F 11/30; H04L 9/32
(52) U.S. Cl. ........................................ 709/220; 713/201
(58) Field of Search ................................ 709/220–222; 713/200–201

(56) References Cited

U.S. PATENT DOCUMENTS

| | | | | |
|---|---|---|---|---|
| 5,905,859 A | * | 5/1999 | Holloway et al. | 713/201 |
| 5,991,881 A | * | 11/1999 | Conklin et al. | 713/201 |
| 6,363,489 B1 | * | 3/2002 | Comay et al. | 713/201 |
| 2002/0035698 A1 | * | 3/2002 | Malan et al. | 713/201 |

FOREIGN PATENT DOCUMENTS

| | | |
|---|---|---|
| JP | 08018582 | 1/1996 |
| JP | 2000124952 | 4/2000 |

OTHER PUBLICATIONS

U.S. Appl. No. 60/231,480.*
U.S. Appl. No. 60/231,481.*
U.S. Appl. No. 60/231,479.*

* cited by examiner

Primary Examiner—Jeffrey Gaffin
Assistant Examiner—David Martinez
(74) Attorney, Agent, or Firm—Katten Muchin Zavis Rosenman

(57) ABSTRACT

An IP communication network system has a plurality of autonomous systems, configuring IP networks of domains independent of each other, for performing interior- and exterior-forwarding of IP packets. The plurality of autonomous systems include a plurality of border relay devices positioned at borders between the IP networks. Each of the plurality of border relay devices includes a discarding unit for discarding, if the IP packet forwarded is an unauthorized intrusion packet, this unauthorized packet when detecting a re-intrusion on the basis of filtering information for detecting the re-intrusion of the unauthorized packet, and a distribution unit for distributing the filtering information to all other border relay devices within the same autonomous system.

11 Claims, 22 Drawing Sheets

FIG. 9

152 BORDER ROUTER INFORMATION

| BORDER ROUTER IP ADDRESS #1 |
|---|
| BORDER ROUTER IP ADDRESS #2 |
| BORDER ROUTER IP ADDRESS #3 |
| BORDER ROUTER IP ADDRESS #4 |
| |
| |
| |

FIG. 10

90
CONNECTION ROUTER INFORMATION

| SELF-ROUTER INFORMATION | CONNECTION ROUTER INFORMATION |
|---|---|
| MAC ADDRESS #1 | CONNECTION ROUTER IP ADDRESS #1 |
| VPI/VCI#1 | CONNECTION ROUTER IP ADDRESS #2 |
| INPUT PORT INFORMATION #1 | CONNECTION ROUTER IP ADDRESS #3 |
| ⋮ | ⋮ |

FIG. 13

JUDGEMENT TYPE OF THRESHOLD VALUE DATA (350)

| JUDGEMENT TYPE OF THRESHOLD VALUE DATA |
|---|
| ICMP 50 TIMES/SEC (1) |
| TELNET 3 TIMES/SEC (1) |
| FTP 3 TIMES/SEC (1) |
| ICMP 80 TIMES/SEC (2) |
| FTP 3 TIMES/SEC (2) |
| ⋮ |

ELEMENTS PER JUDGEMENT TYPE

ICMP 50 TIMES/SEC (1): JUDGED TO BE UNAUTHORIZED ACCESS WHEN ALL THE FOLLOWING CONDITIONS ARE COINCIDENT WITH AND CONDITIONS

| | |
|---|---|
| UNAUTHORIZED ACCESS TRY COUNT | 50 TIMES/SEC |
| APPLICATION IDENTIFIER | NO IDENTIFIER |
| MESSAGE TYPE | ICMP ECHO |
| SAME USER JUDGEMENT | NEGATED |
| SAME SESSION JUDGEMENT | NEGATED |
| INPUT COMMAND | NO COMMAND |
| ALARM FUNCTION | ALARMED |
| MONITORING START TIME | ALL |
| MONITORING END TIME | ALL |
| ⋮ | ⋮ |

TELNET 3 TIMES/SEC (1): JUDGED TO BE UNAUTHORIZED ACCESS WHEN ALL THE FOLLOWING CONDITIONS ARE COINCIDENT WITH AND CONDITIONS

| | |
|---|---|
| UNAUTHORIZED ACCESS TRY COUNT | 3 TIMES/SEC |
| APPLICATION IDENTIFIER | TELNET |
| MESSAGE TYPE | NOTHING |
| SAME SESSION JUDGEMENT | JUDGED |
| SAME USER JUDGEMENT | JUDGED |
| INPUT COMMAND | PING |
| ALARM FUNCTION | ALARMED |
| MONITORING START TIME | 01:00 |
| MONITORING END TIME | 06:00 |
| ⋮ | ⋮ |

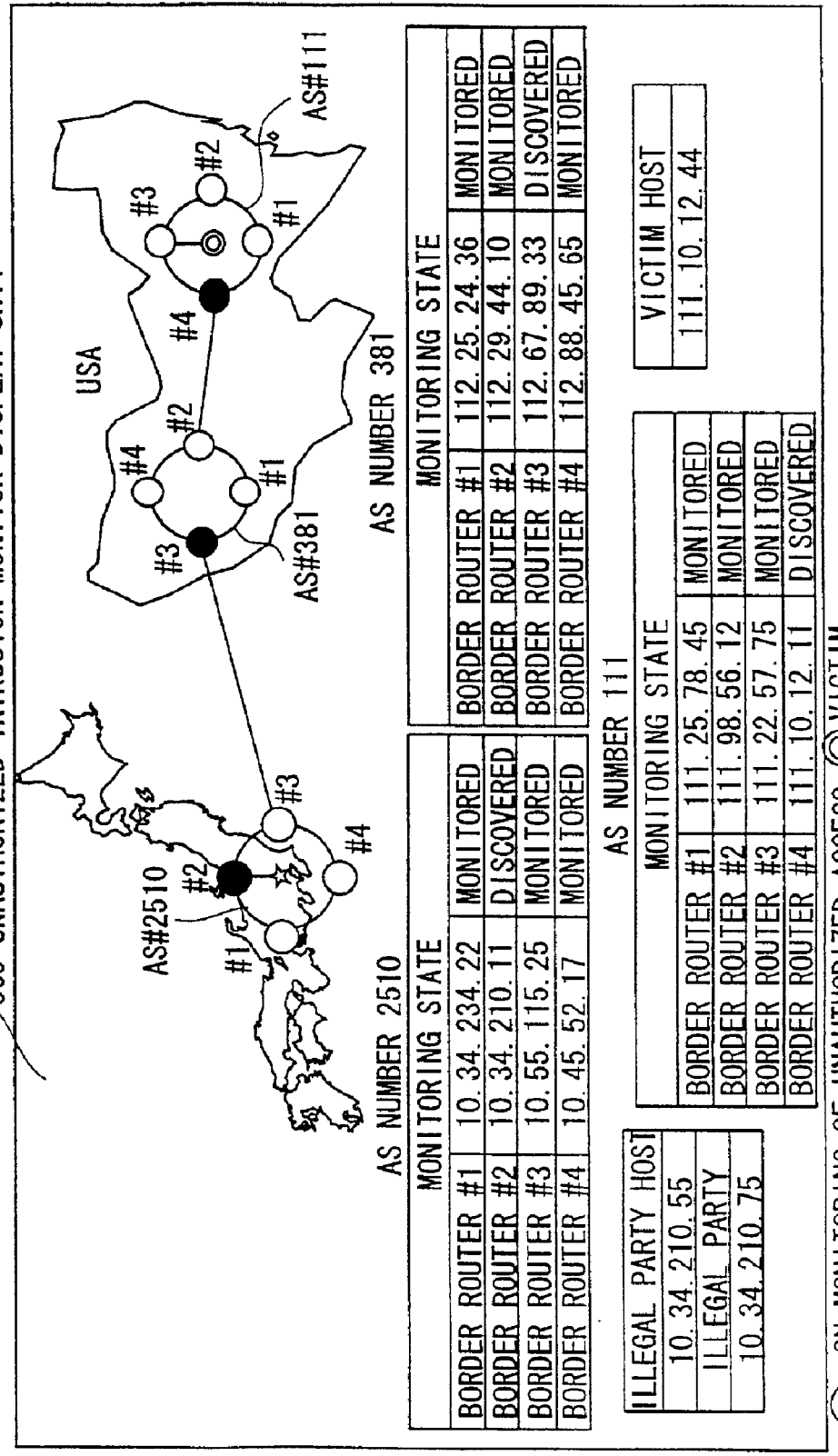

IP NETWORK SYSTEM HAVING UNAUTHORIZED INTRUSION SAFEGUARD FUNCTION

BACKGROUND OF THE INVENTION

The present invention relates generally to an IP (Internet Protocol) communication network system having a function of preventing an illegal act, and more particularly to an IP communication network system capable of preventing the illegal act by detecting (tracing) malicious data communications with a host computer of an autonomous system (AS) in the Internet.

The host computer and the Internet are required to be protected from an illegal act party (which might hereinafter be simply referred to as an illegal party) by pinpointing an originator of the illegal act (which might hereinafter be termed an unauthorized access) occurred in the Internet defined as an IP network spreading on a worldwide scale and automatically shutting off the same originator.

This illegal act may include categories such as a DoS (Denial of Service) attack scheming a system-down of the host computer by, for example, deliberately transmitting a tremendous quantity of invalid packets to the specified host computer, and repeated unauthorized accessing to the host computer in a way that seeks out a password of an authorized user by changing it in order to illegally obtain this password.

The data are forwarded (which includes being transferred and switched) in the form of packets in the IP network such as the Internet, and it is therefore feasible to pinpoint the illegal party by tracing network routers (which might hereinafter be simply routers) via which the IP packet arrived, back to the illegal party.

There is an algorithm for searching an intruding route of the unauthorized packet within the IP network by comparing logs of the IP packets that are recorded in the network routers with a time when the unauthorized intrusion occurs, and thus pinpointing the illegal party.

Moreover, there is an architecture for safeguarding the host computer and the IP network, wherein a specially-designed computer known as a Fire Wall is provided between the internal network and an external network in order to block the unauthorized intrusion, and the Fire Wall restricts specified packets (specified addresses and service port) by use of a packet filtering technology.

Further, there are two types of conventional technologies that will be shown as follows. The first technology is NetRanger (registered trademark) made by Cisco Corp. FIG. 1 is a diagram showing a concept of NetRanger. Referring to FIG. 1, if the illegal party schemes an unauthorized access to and thus intrudes a host computer (HOST) 3 via the IP network, this system functions so that an unauthorized access monitoring unit (intrusion detection tool) 4 attached to the host computer 3 detects an abnormality by making a judgement about log-in for checking a connectability of the network and about a threshold value of ping (Packet Internet Groper), and recognizing an operation pattern characteristic (which may be called a search for "spoofing").

The unauthorized access monitoring unit 4 notifies the router 1 and the Fire Wall 2 of a detection of the abnormal state, and requests the router 1 and the Fire Wall 2 to create a filtering table 5 for cutting off a connection to the host computer 3 at which the unauthorized access is targeted.

Owing to the creation of this filtering table 5, even if scheming the intrusion once again, the unauthorized packet is filtered and discarded at the stage anterior to the host computer 5, with the result that the illegal party is unable to attack at host computer 5.

The second technology is a data tracing system disclosed in Japanese Patent Application Laying-Open Publication No.2000-124952. FIG. 2 is a diagram showing a concept of this data tracing system. Referring to FIG. 2, this system functions so that if an unauthorized access party 6 intrudes a host computer 9A via the IP network, an unauthorized access detection unit 9B attached to the host computer 9A detects a fact of the unauthorized access, and notifies a management system 9C of this unauthorized access.

The management system 9C requests a router 7C disposed anterior to the detection unit 9B to trace the routers back to the source of this unauthorized access. The router 7C accepting the tracing request functions to compare characteristic information of the unauthorized access party 6 with data to be routed by the router 7C itself, and is, when detecting the unauthorized data, capable of detecting a router 7B having routed the unauthorized data, which is disposed one anterior to the router 7C itself, on the basis of an intra unauthorized data analysis 8C of a data link layer.

The router 7C requests the traced-back router 7B to further trace routers back to the source of the unauthorized access, and simultaneously notifies the management system 9C of information on the traced-back router 7B disposed anterior thereto. The routers 7A, 7B and 7C (including analyses 8A, 8B and 8C of the data link layer) each having such a function are provided in chain in the network, whereby the originator, i.e., the unauthorized access party 6 can be eventually pinpointed.

According to this data tracing system, if the unauthorized access party 6 is pinpointed, an alarm is issued to this party 6, and the network administrator is notified of this issuance of alarm.

The IP communication network system where a multiplicity of unspecified individual and office users use the IP network as they intend, has a potentiality of hazard in which the unauthorized access may come from anywhere in the IP network on the whole.

The conventional technologies described above, though capable of detecting the unauthorized party in the comparatively small-configured IP network and safeguarding the network from the intrusion, do not exhibit sufficient effect in the IP network expanding on the worldwide scale.

Namely, each of the conventional technologies, through capable of safeguarding the most computer from the illegal act such as deliberately forwarding a tremendous quantity IP packets by filtering those packets with the Fire Wall etc, has such an inevitability that the normal packet control is adversely influenced by a rise in traffic in the whole IP network due to the large quantity of unauthorized packets.

Further, for detecting the unauthorized access and pinpointing the unauthorized access party, the routers must be traced one by one back to the unauthorized access party, and this operation requires a great deal of time till the unauthorized access party is pinpointed in the Internet where the multiplicity of routers are provided on the routes.

Moreover, the routes are frequently changed in the Internet, and, according to the router tracing algorithm, when the route is changed, the tracing might be performed again from the beginning.

SUMMARY OF THE INVENTION

It is a primary object of the present invention, which was devised to obviate the problems inherent in the prior arts described above, to provide an IP communication network system and an unauthorized intrusion safeguard method that are capable of shutting off a re-intrusion of an unauthorized packet at a high speed.

To accomplish the above object, Applicants disclose an IP communication network system, apparatus and method according to the present invention. The IP communication network system comprises a plurality of autonomous systems, configuring IP networks of domains independent of each other, for performing interior- and exterior-forwarding of IP packets. The plurality of autonomous systems include a plurality of border relay devices positioned at borders between the IP networks. Each of the plurality of border relay devices includes a discarding unit for discarding, if the IP packet forwarded is an unauthorized intrusion packet, this unauthorized packet when detecting a re-intrusion on the basis of filtering information for detecting the re-intrusion of the unauthorized packet, and a distribution unit for distributing the filtering information to all other border relay devices within the same autonomous system.

A host computer of each of the plurality of autonomous systems includes a detection unit for detecting based on predetermined items of judging information that the IP packet forwarded is the unauthorized intrusion packet. Once detected, the distribution unit of the border relay device further distributes the filtering information to the border relay device within the autonomous System facing to the autonomous system from which the unauthorized packet is forwarded.

A border relay device in the autonomous system includes a discarding unit for discarding, if the IP packet forwarded is an unauthorized intrusion packet, this unauthorized packet when detecting a re-intrusion on the basis of filtering information for detecting the re-intrusion of the unauthorized packet; and a distribution unit for distributing the filtering information to all the relay devices within the same autonomous system.

According to the present invention, it is feasible to pinpoint and shut off an illegal party by directly detecting the illegal party at a border at a high speed (in a short time) without tracing relay points one by one back to the illegal party intruding via the IP network, i.e., the autonomous system of other common carrier (other provider).

Further, the illegal party information (the filtering information) is transmitted to all the borders within the same autonomous system (the same common carrier network), thereby safeguarding the whole of the autonomous system and preventing the re-intrusion of the unauthorized access IP packet.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 9 is an explanatory diagram showing border router information;

FIG. 10 is an explanatory diagram showing connecting router information;

FIG. 13 is an explanatory diagram showing elements per judgement type in the threshold value data;

FIG. 14 is a diagram showing a display example of an unauthorized intrusion monitoring state;

DETAILED DESCRIPTION OF THE PREFERRED EMBODIMENTS

Next, embodiments of the present invention will hereinafter be described with reference to the accompanying drawings.

[Whole Architecture of IP Communication Network System]

Figure 1:
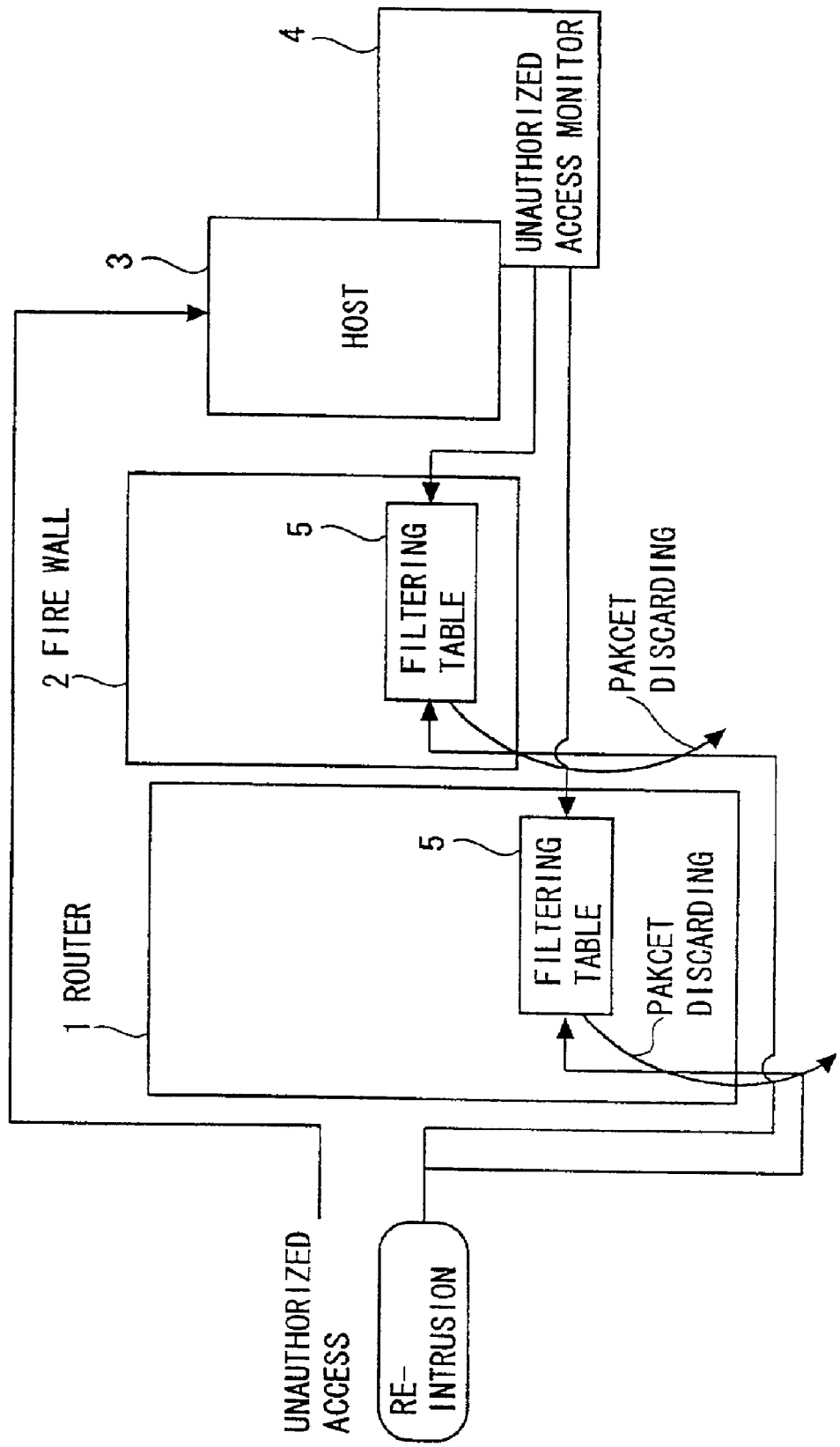
FIG. 1 is an explanatory diagram showing a first example of a convention IP communication network system.
Figure 2:
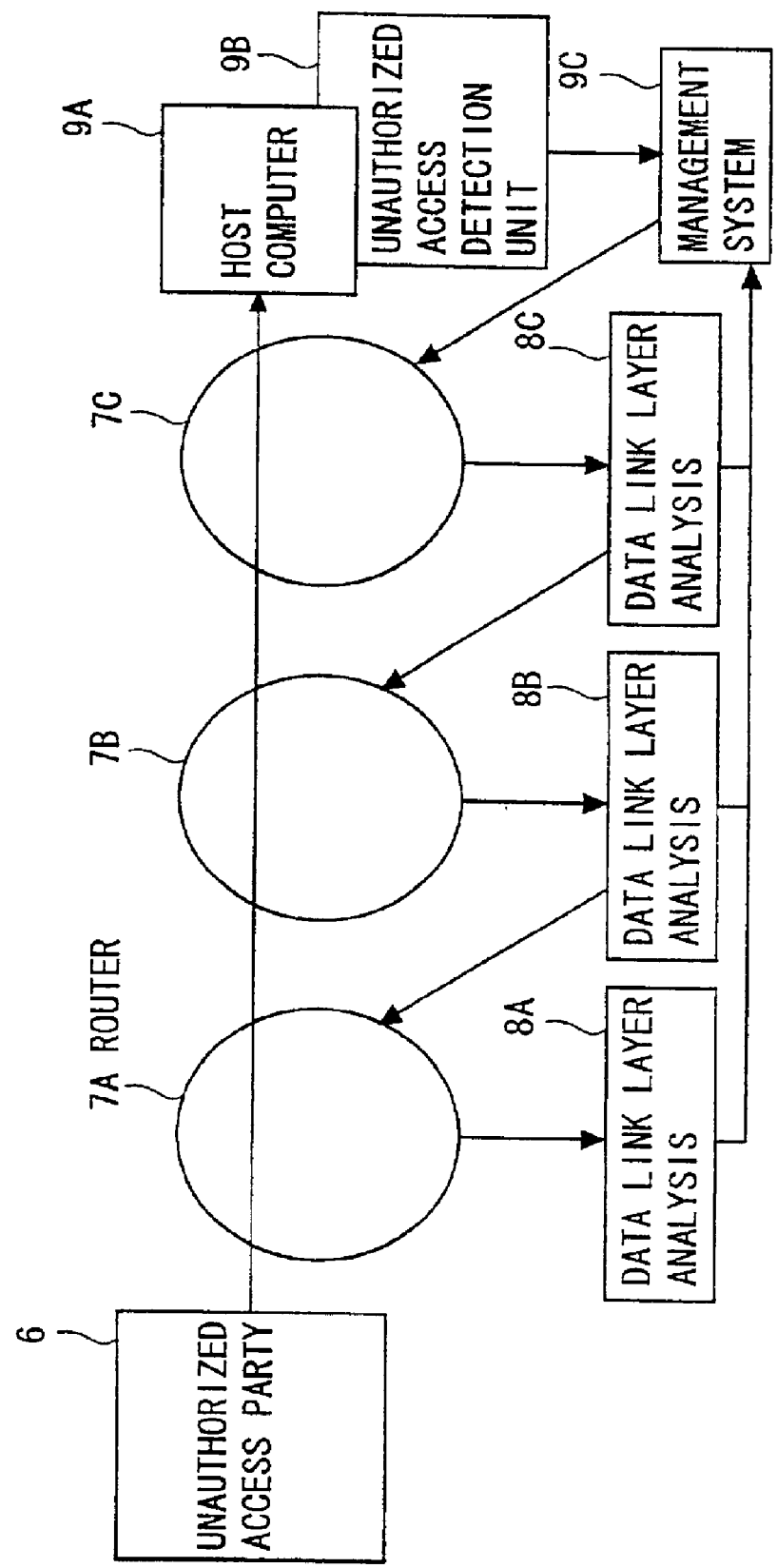
FIG. 2 is an explanatory diagram showing a second example of a convention IP communication network system.
Figure 3:
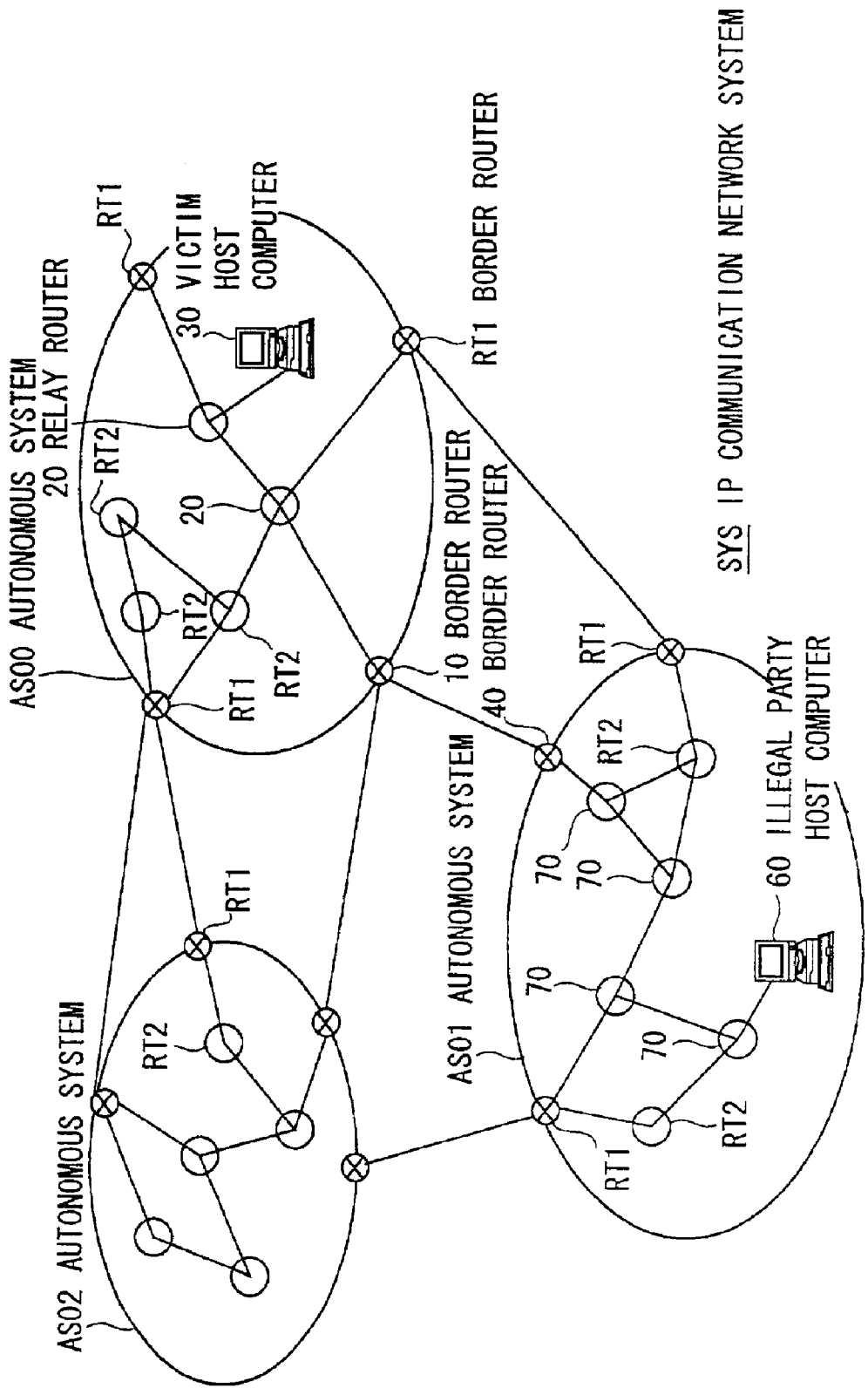
FIG. 3 is a block diagram showing an architecture of an IP communication network system in one embodiment of the present invention.

FIG. 3 is a view showing a whole architecture of an IP communication network system in one embodiment of the present invention. Referring to FIG. 3, this IP communication network system SYS is applied to the Internet as an IP network.

The IP communication network system SYS embraces a plurality of autonomous systems AS00, AS01 and AS02. The autonomous systems AS00, AS01, AS02 are each known as a domain or an internal system. The autonomous system corresponds to one single Internet service provider or Intranet of an enterprise. Each of the autonomous systems AS00, AS01, AS02 configures an IP network of an independent domain, and performs interior- and exterior-forwarding of the IP packets.

The autonomous systems AS00, AS01, AS02 are connected to each other via border gateways (network routers) known also as border routers RT1. The border routers RT1 are connected to each other via relay routers RT2 in the respective autonomous systems AS00, AS01, AS02. Each relay router RT2 can accommodate a host computer. Further, a plurality of user terminal devices (such as personal computers etc) are connectable to the host computer.

It is assumed in an example given herein that a relay router (RT2) 20 within the autonomous system AS00 accommodates a host computer 30 at which an illegal act is targeted (which will hereinafter be called a victim host computer), while a relay router (RT2) 70 within the autonomous system AS01 accommodates an illegal party host computer 60. The autonomous systems AS00 and AS01 are connected to each other via border routers (RT1) 10, 40.

In the thus configured IP communication network system SYS, a background for making it difficult to catch the illegal party host computer 60 is that an unauthorized packet reaches the victim host computer 30 from the illegal party host computer 60 via a multiplicity of routers (RT1, RT2) 10, 20, 40, 70 in the plurality of autonomous systems AS00, AS01.

As will be discussed later on, however, a special mechanism is provided in each of the border routers RT1, thereby making it possible to trace the routers back to a source of the unauthorized packet and to shut off a re-intrusion of the unauthorized packet at a high speed.

[Outlines of Architectures and Operations of Border Router and Victim Host Computer]

Given next is an explanation of outlines of architectures and operations of the border router 10 and the victim host computer 30, which are disposed in the autonomous system AS00 in the IP communication network system SYS shown in FIG. 3.

Figure 4:
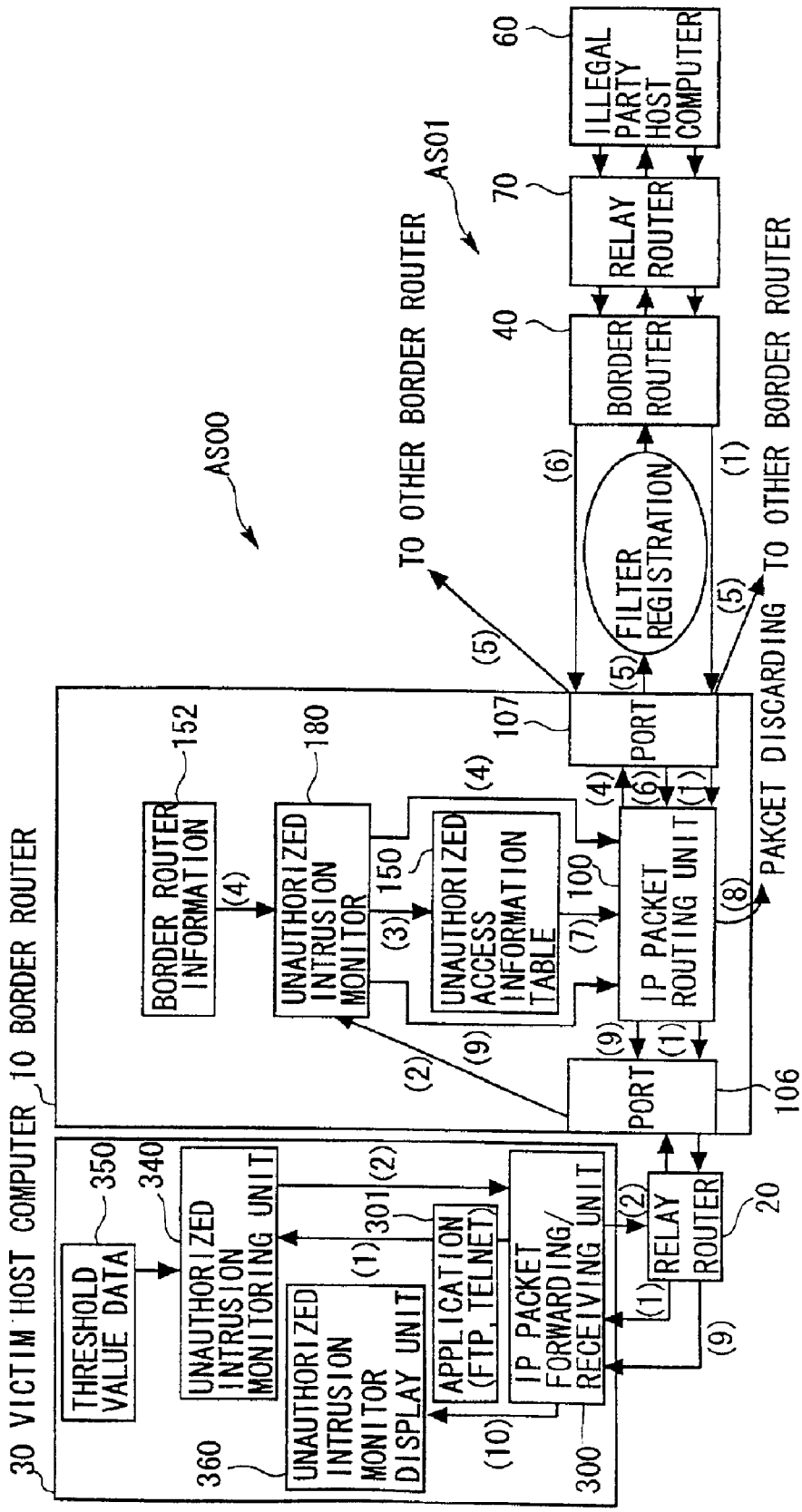
FIG. 4 is an explanatory block diagram showing outlines of architectures and operations of a border router and a victim host computer.

Referring to FIGS. 3 and 4, if an unauthorized access packet is forwarded from the host computer (illegal party) 60 to which an unillustrated illegal party terminal device is connected within the autonomous system AS01, this unauthorized access packet reaches the border router 10 in the autonomous system AS00 via the relay router 70 and the border router 40 as well.

The unauthorized access packet having reached the border router 10 passes through an IP packet routing unit 100 within the border router 10, and is thereafter received by an IP packet forwarding/receiving unit 300 of the host computer (victim) 30 via the relay router 20.

The unauthorized access packet is further transferred to an unauthorized intrusion monitoring unit 340 through an application protocol (which will hereinafter simply be referred to as an application) of a TCP/IP (Transmission Control Protocol over Internet Protocol) layer (operation step OP1).

Next, the unauthorized intrusion monitoring unit 340 refers to threshold value data 350 and, if over a predetermined threshold value, notifies the IP packet forwarding/receiving unit 300 of unauthorized access occurrence data (which is search request data that will be explained in depth later on) indicating that the unauthorized access occurs. An administrator of the host computer 30 presets the threshold value data 350.

The unauthorized access occurrence data transmitted from the IP packet forwarding/receiving unit 300 is inputted to a port 106 of the border router 10 via the relay router 20, and an unauthorized intrusion monitor 180 is notified of this item of unauthorized access occurrence data. Note that the unauthorized intrusion monitor 180 is notified of the unauthorized access occurrence data via precisely via the IP packet routing unit 100 from the port 106 (OP2).

The unauthorized intrusion monitor 180 registers an unauthorized access information table 150 with unauthorized access information based on the unauthorized access occurrence data received (OP3). Further, the unauthorized intrusion monitor 180 refers to border router information 152 and determines an information distributed destination (OP4).

The border router 10 notifies other routers RT1, 40 in the self autonomous system AS00 and other autonomous system AS01 adjacent thereto, of a content of the unauthorized access information table 150, and requests the routers RT1, 40 to register the same content in the unauthorized access information table in each border router (OP5).

Thereafter, if the illegal party host computer 60 in the autonomous system AS01 makes a re-intrusion, the unauthorized access packet enters the IP packet routing unit 100 via the port 107 (OP6). The IP packet routing unit 100 refers to the unauthorized access information table 150, and compares its content with a content of the unauthorized access packet received (OP7).

As a result of this comparison, if these contents are coincident, the IP packet routing unit 100 discards the unauthorized access packet and shuts off the unauthorized access (OP8).

Thus, the content of the unauthorized access information table 150 within the border router 10 in the autonomous system AS00 can be exchanged (registered) with the content of the unauthorized access information table 150 within the border router 40 in other autonomous system AS01 adjacent thereto. It is therefore feasible to search the intruding route of the illegal party at a high speed and to safeguard the autonomous system AS00 etc on an autonomous network basis from the intrusion of the unauthorized access packet.

Moreover, the following operations are performed in order for the victim host computer 30 to grasp a situation of monitoring the illegal party.

To be specific, in the operation step OP3 described above, the unauthorized intrusion monitor 180 comes to a unauthorized intrusion monitoring status. In the operation step OP8 given above, the IP packet routing unit 100, when discovering the unauthorized access packet, informs the host computer 30 of a situation (corresponding to unauthorized intrusion response data which will hereinafter be described in depth) of each of the border routers 10, 40, RT1 (OP9).

Further, the IP packet forwarding/receiving unit 300 of the host computer 30 transfers the informed situation data of each of the border routers 10, 40, RT1 to an unauthorized intrusion monitor display unit 360, and these pieces of situation data are displayed on the display unit 360 (OP10).

[Detailed Architectures and Operations of Border Router and Victim Host Computer]

Next, the architectures and operations of the border router 10 and of the victim host computer 30 provided in the autonomous system AS00 in the IP communication network system SYS shown in FIGS. 3 and 4, will be explained in details.

(Process When Illegal Party Intrudes Victim Host Computer)

Figure 15:
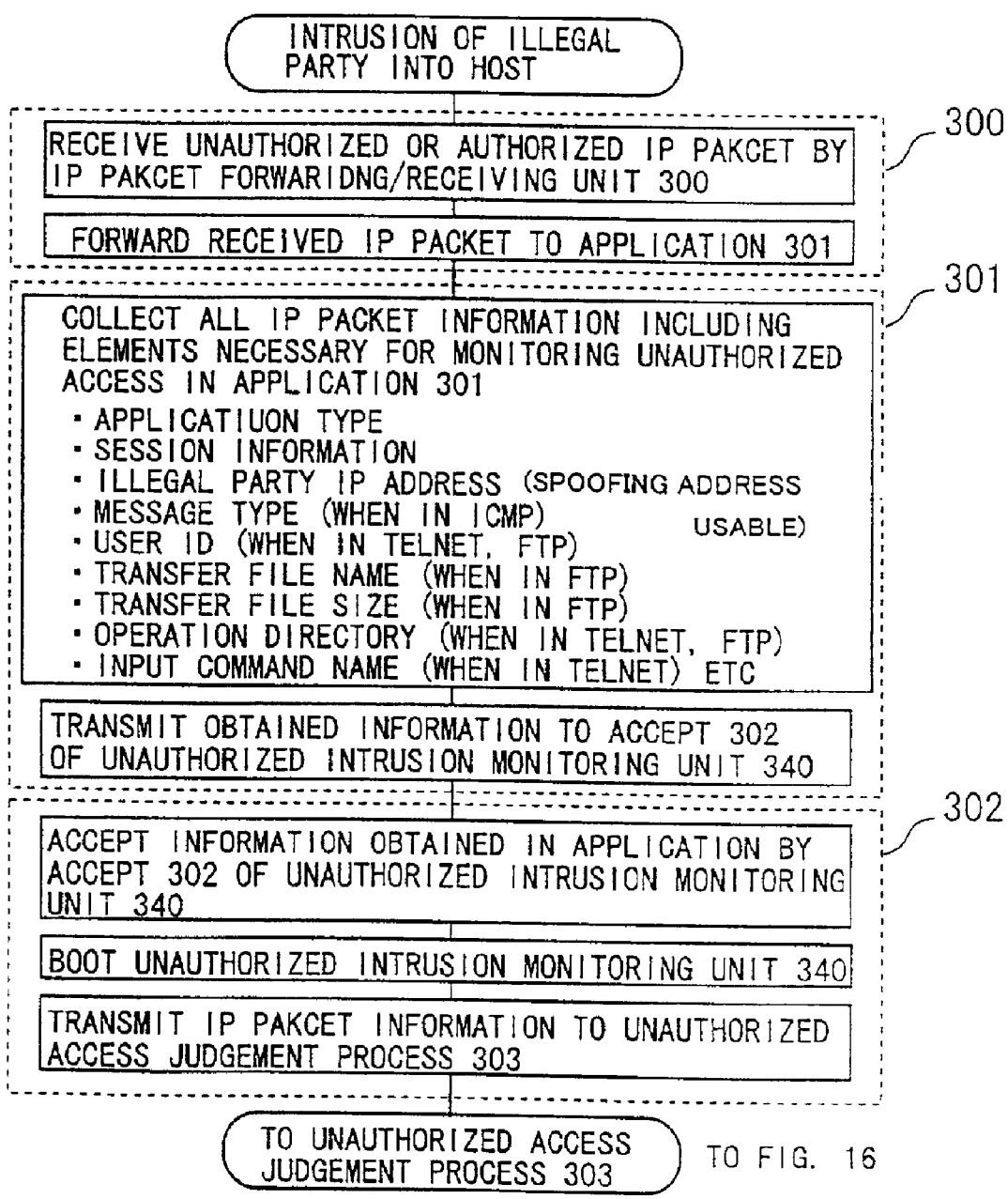
FIG. 15 is a flowchart showing processes executed when an illegal party intrudes in the victim host computer.
Figure 16:
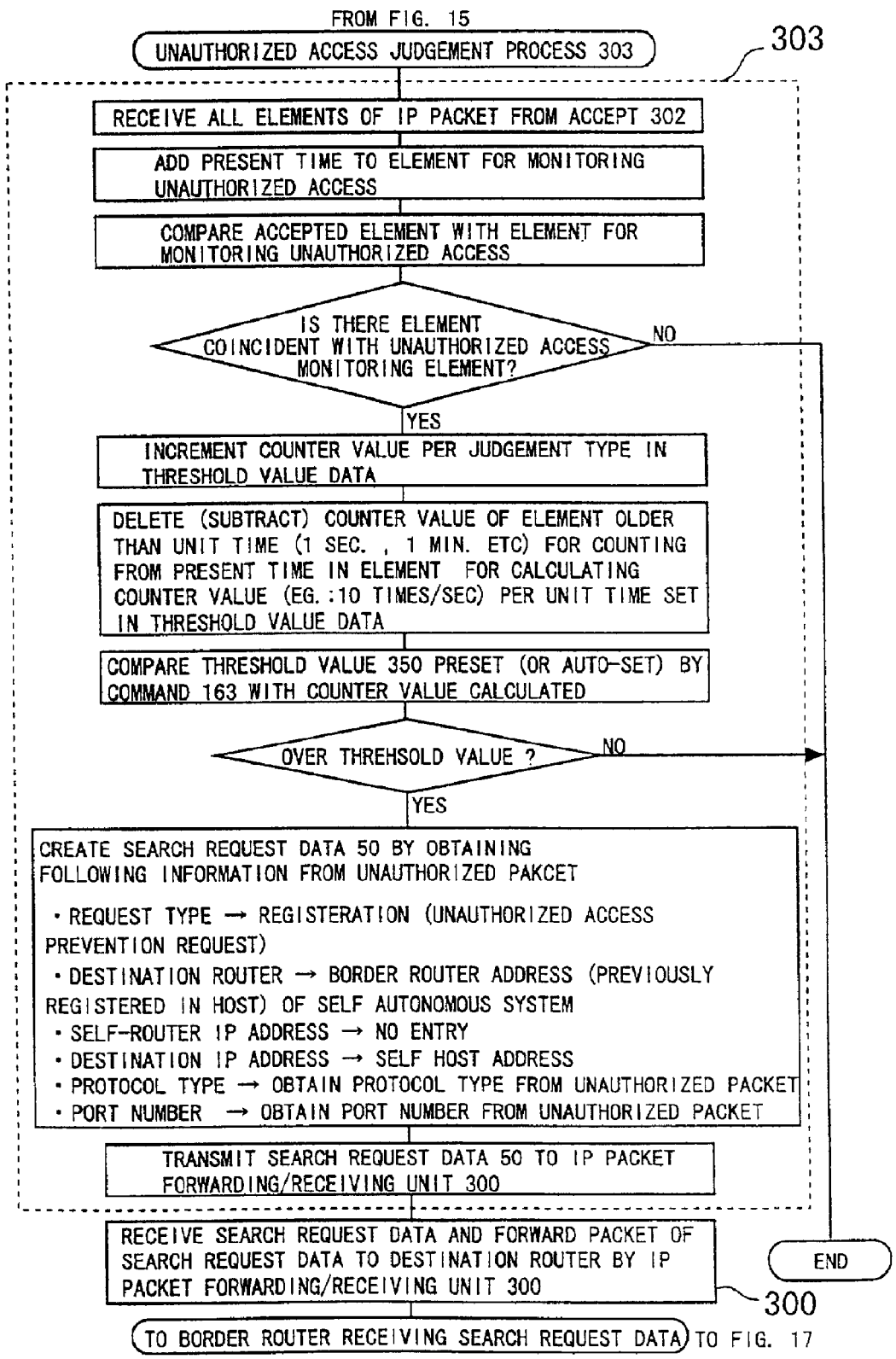
FIG. 16 is a flowchart showing processes executed when the illegal party intrudes in the victim host computer.

FIGS. 15 and 16 show processing steps executed when the illegal party intrudes in the victim host computer 30.

Figure 5:
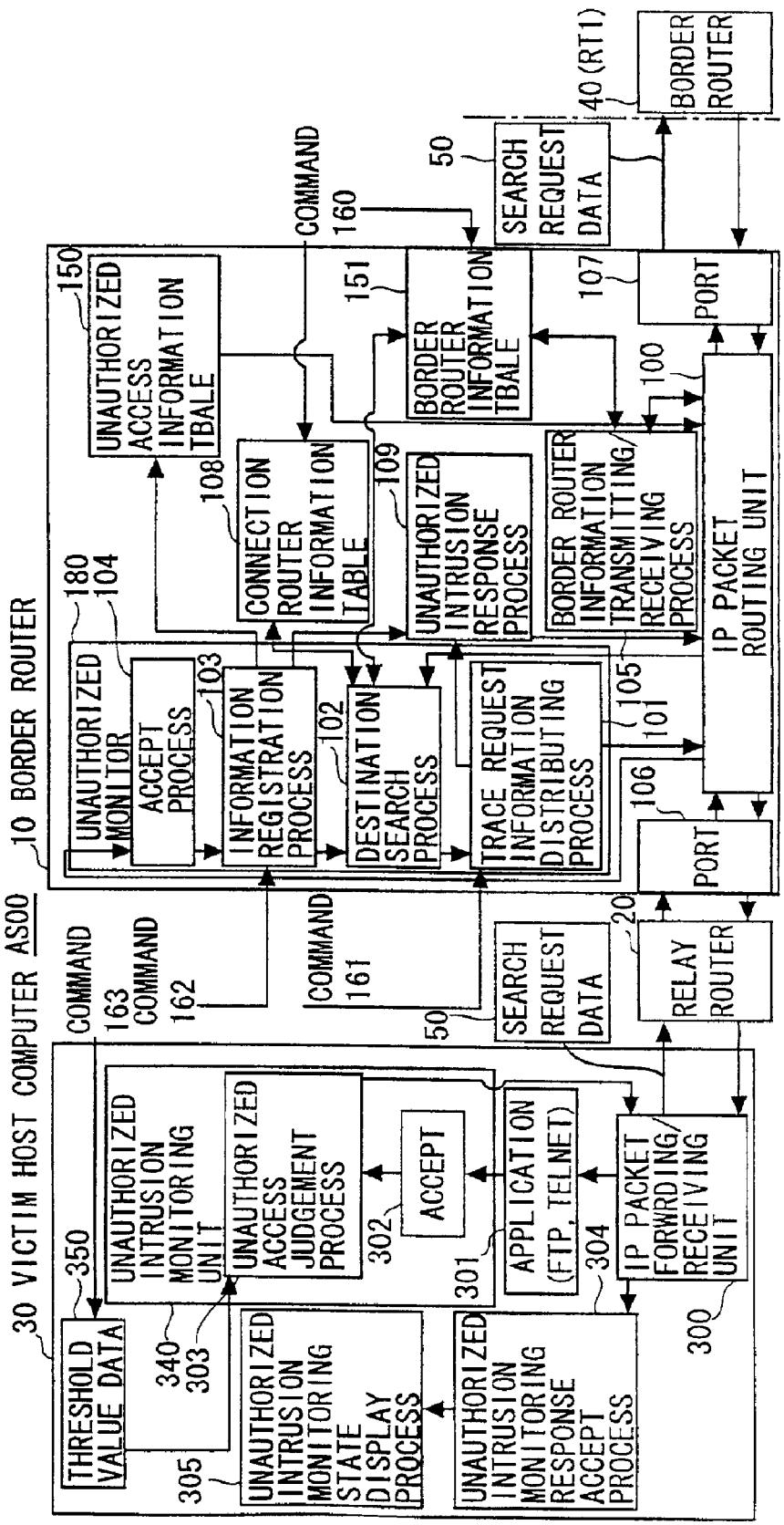
FIG. 5 is an explanatory block diagram showing detailed architectures and operations of the border router and the victim host computer.

Referring to FIG. 5 and related drawings, if the illegal party host computer 60 in the autonomous system AS01 forwards an unauthorized access IP packet, this unauthorized access packet (which might hereinafter be referred to as simply an unauthorized packet) reaches the border router 10 in the autonomous system AS00 via the relay router 70 and the border router 40.

The unauthorized access packet having reached the border router 10 passes through the port 107 in the border router 10, the IP packet routing unit 100 and the port 106, and is thereafter received by the IP packet forwarding/receiving unit 300 of the victim host computer (HOST) 30 via the relay router 20.

The unauthorized access packet is further transferred to the unauthorized intrusion monitoring unit 340 through the application 301. Namely, the application 301 such as an FTP (File Transfer Protocol) and Telnet (Telecommunication Network Protocol) on the TCP/IP layer, boots the unauthorized intrusion monitor function by transmitting, to an accept unit 302 of the unauthorized intrusion monitoring unit 340, an application type, session data, an IP address (including a spoofing address) of the illegal party, a message type, a user ID, a transfer file name, a transfer file size, an operation directory and an input command name as necessary items of information for making the judgement about the unauthorized access.

The unauthorized intrusion monitoring unit 340, when booted, judges based on the threshold value data 350 in a threshold value data table (unillustrated) whether the unauthorized intrusion occurs or not. Based on the processing steps shown in FIG. 16, an unauthorized access judgment processing unit 303 of the unauthorized intrusion monitoring unit 340 distinguishes from the application category and the session data received via the accept unit 302 from the application 301 whether it is a repetitive attack of the same command etc by the same user or a simple rise in traffic, and thereafter compares it with the threshold value data 350.

Figure 8:
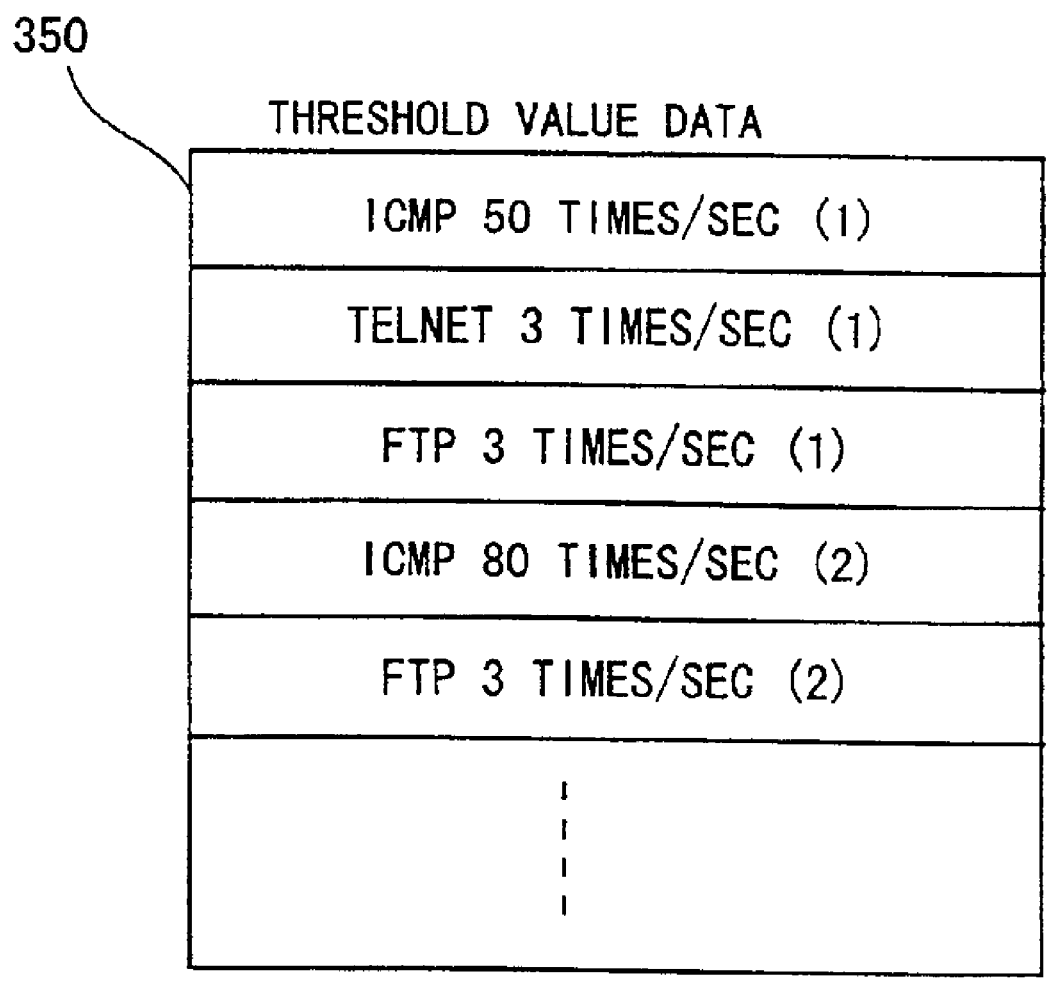
FIG. 8 is an explanatory diagram showing threshold value data.

The threshold value data 350 contains, as shown in FIG. 8, types (application type, message type etc) for monitoring the unauthorized access, and unauthorized try counts. The threshold value data 350 contains, as shown in FIG. 13, a plurality of elements (conditions) for each judgement type in order to monitor the illegal act, and is registered so that the illegal act, it is judged, has occurred when the respective elements are all met.

This setting enhances preciseness of detecting the unauthorized access packet. The threshold value data 350 is preset by the administrator of the victim host computer 30 through an input of a command 163 in accordance with its using state.

More preferably, the unauthorized intrusion monitoring unit 340 of the host computer 30 is constructed so as not to forward and receive a packet containing virus data by setting virus characteristic data other than the threshold value data 350 for preventing the unauthorized intrusion as by the unauthorized access.

The unauthorized access judgement processing unit 303 of the unauthorized intrusion monitoring unit 340, when judging that the unauthorized access occurs, create search request data 50 containing request types [registration (unauthorized access prevention request)], and notifies the border router 10 of the data 50 in the form of the packet via the IP packet forwarding/receiving unit 300 and the relay router 20.

Figure 6:
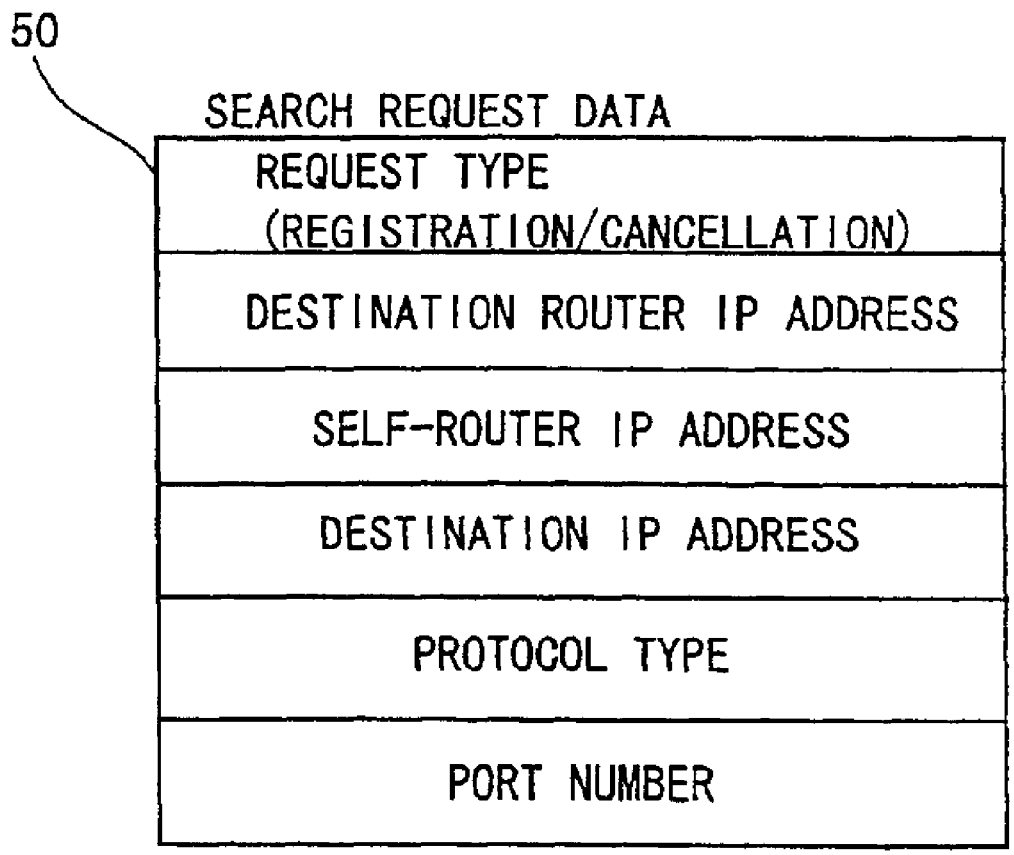
FIG. 6 is an explanatory diagram showing search request data.

The search request data 50, as FIG. 6 shows one example, contains one set of data such as a destination router (border router) IP address, a self-router IP address, a destination (victim host computer 30) IP address, a protocol type, and a port number.

(Process Executed When Distributing Illegal Party Data in Border Router)

Figure 17:
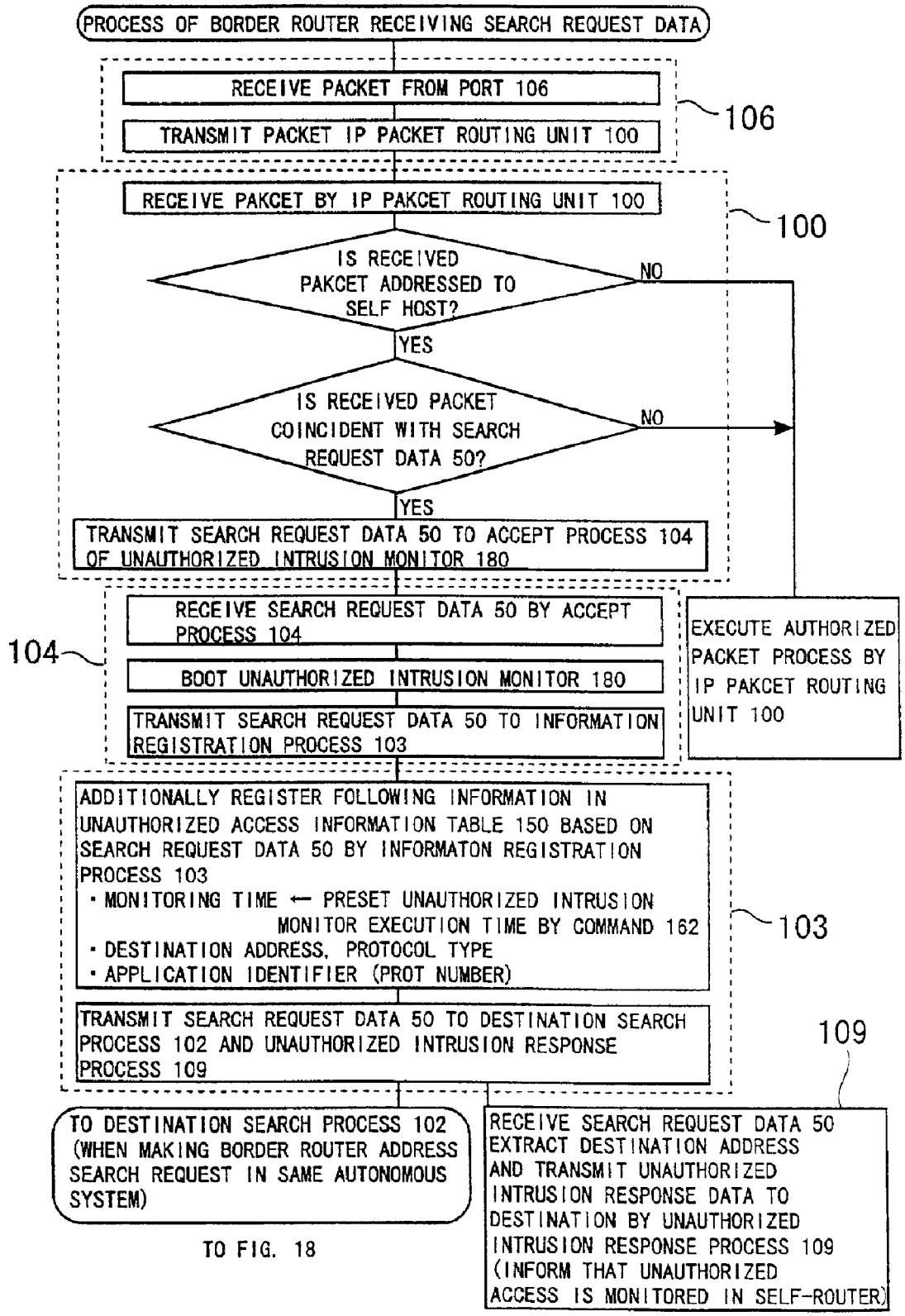
FIG. 17 is a flowchart showing processes executed when distributing the illegal party information in the border router.
Figure 18:
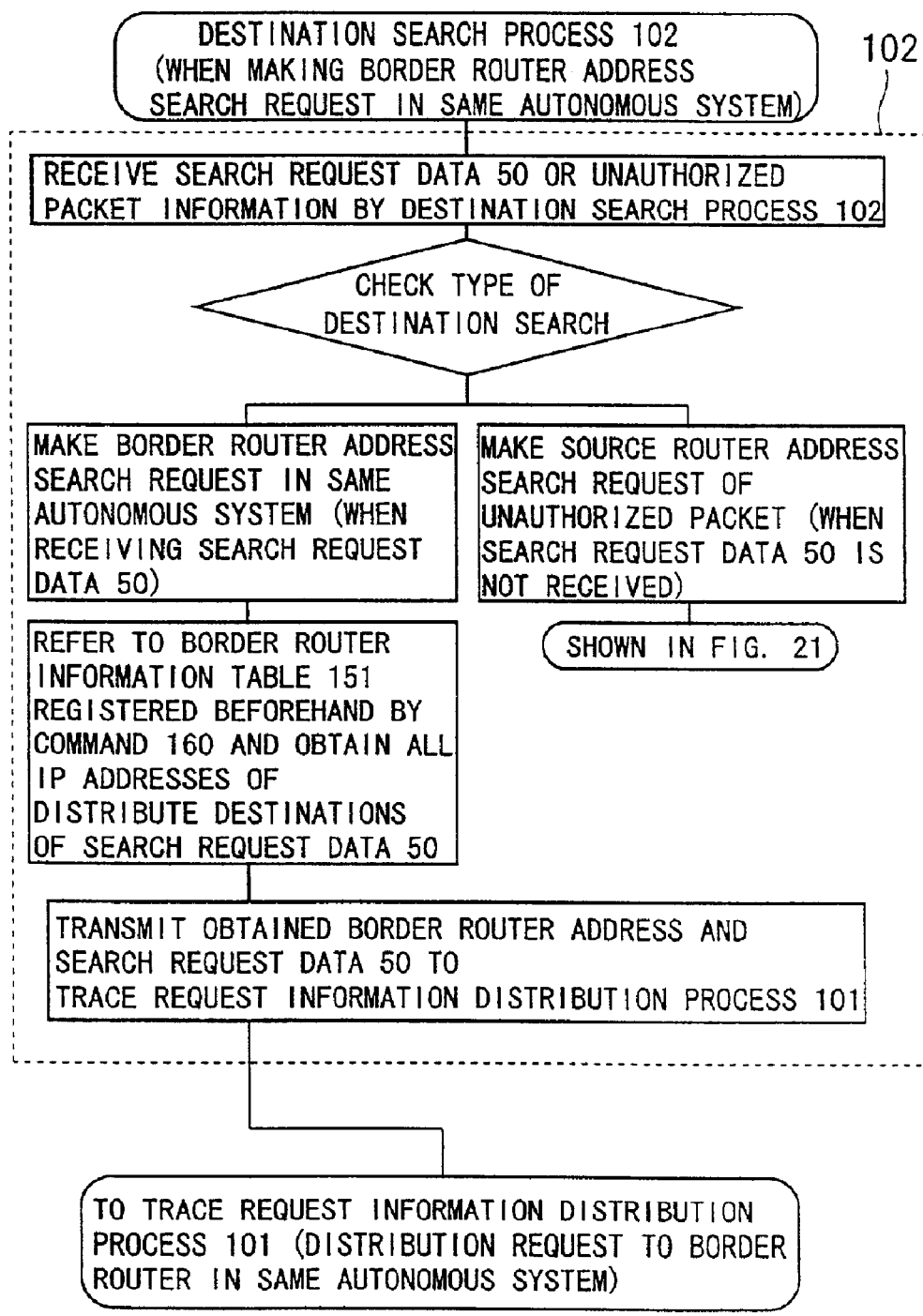
FIG. 18 is a flowchart showing processes executed when distributing the illegal party information in the border router.
Figure 19:
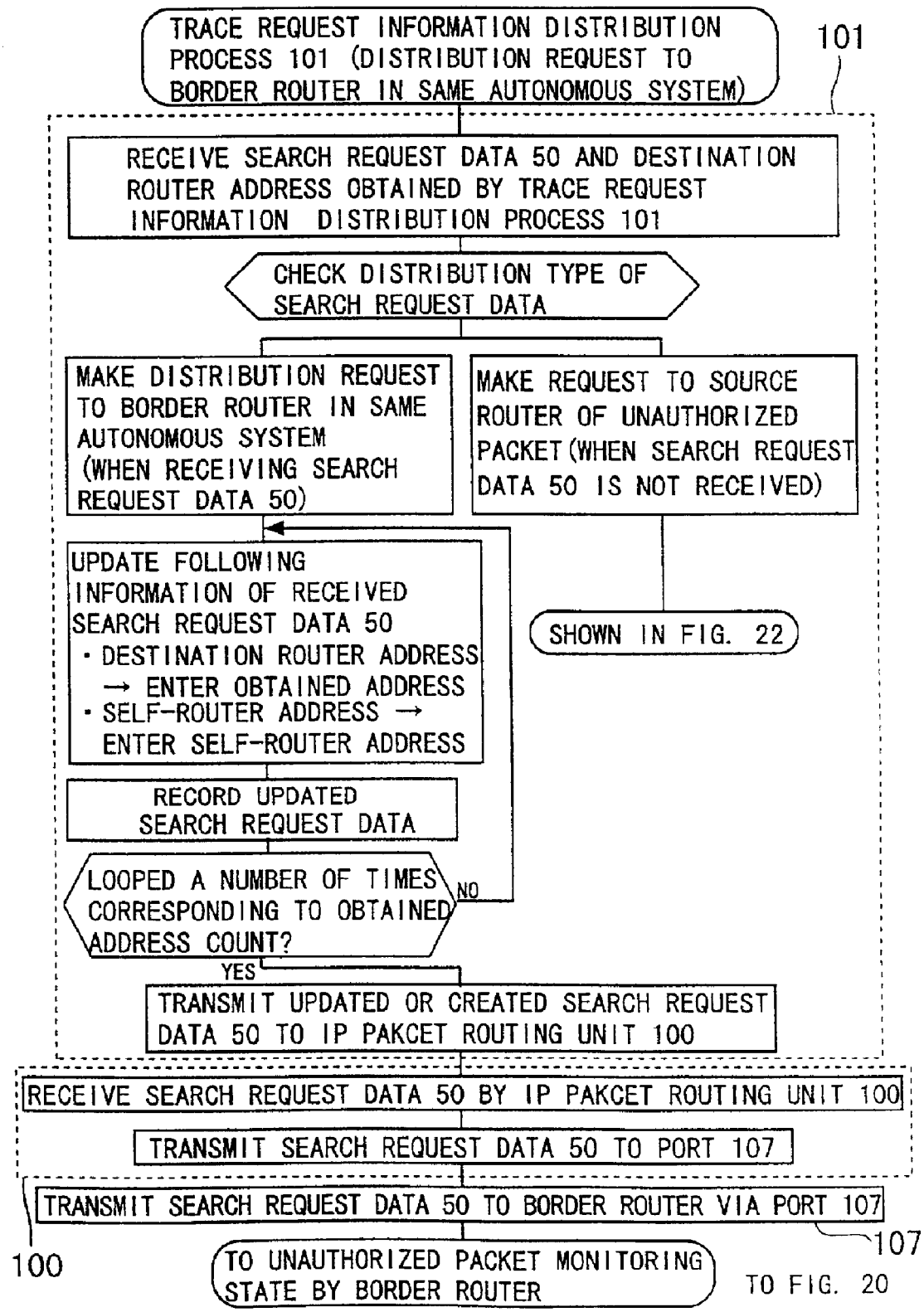
FIG. 19 is a flowchart showing processes executed when distributing the illegal party information in the border router.

FIGS. 17, 18 and 19 show processing steps executed when distributing the illegal party data (search request data) in the border router.

In the border router 10 notified of an occurrence of the unauthorized access judged based on the search request data 50 from the victim host computer 30, the accept processing unit 104 of the unauthorized intrusion monitor 180 is booted through the IP packet routing unit 100 from the port 106.

Figure 7:
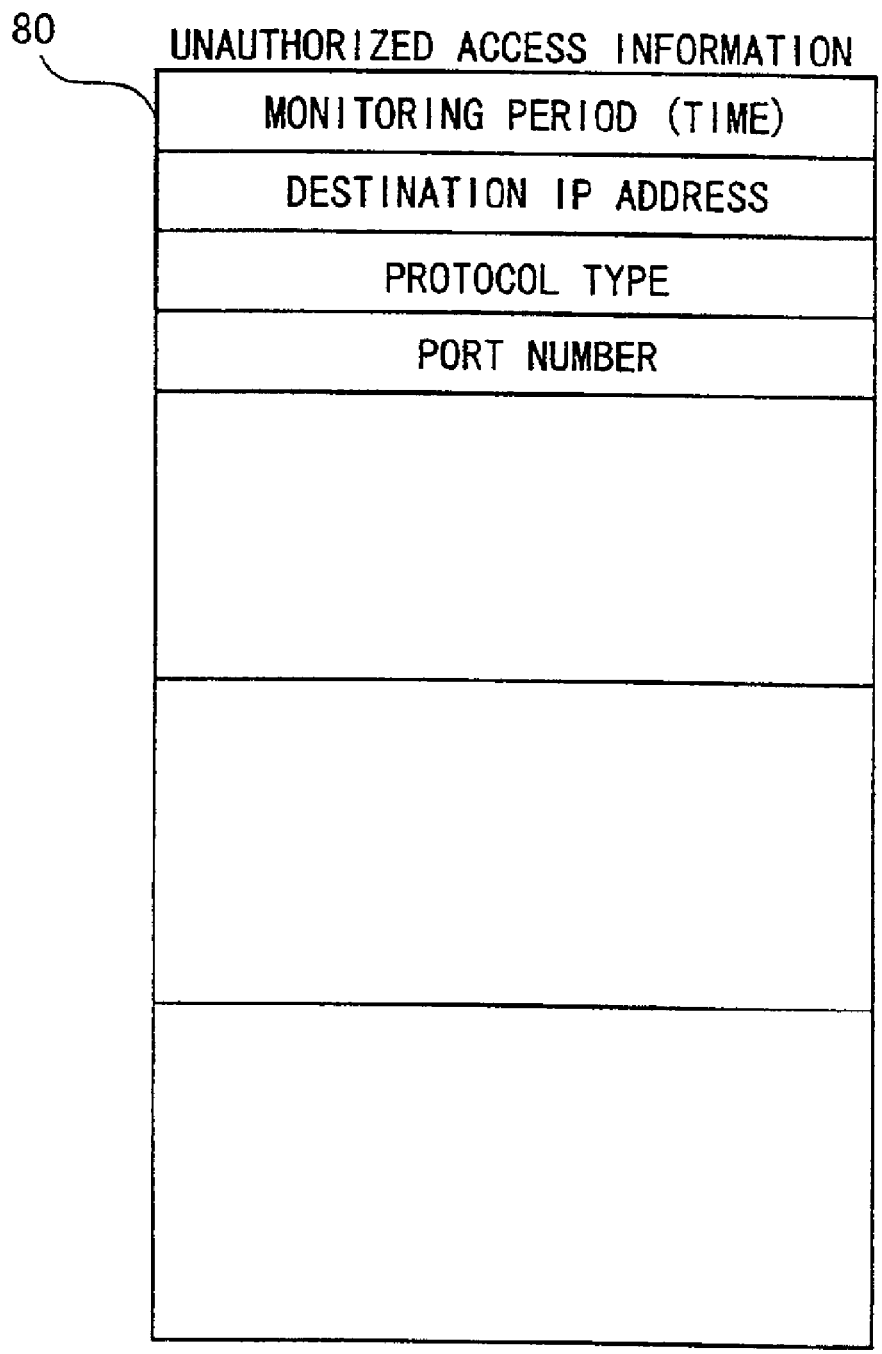
FIG. 7 is an explanatory diagram showing unauthorized access information.

An information registration processing unit 103 in the unauthorized intrusion monitor 180 (additionally) registers the unauthorized access information table 150 with the destination IP address corresponding to the victim host computer 30, the protocol type and the port number as pieces of unauthorized access information 80 (see FIG. 7) among pieces of illegal party information contained in the search request data 50. Further, an information registration processing unit 103 transmits the search request data 50 to a destination search processing unit 102 and an unauthorized intrusion response processing unit 109. With this operation, the border router 10 comes to a status of monitoring the unauthorized access packet to the victim host computer 30 from the illegal party host computer 60.

Note that an unauthorized access monitoring period (time) may be preset in the information registration processing unit 103 by the command 162. In this case, when the predetermined monitoring period expires, the monitoring of the unauthorized access stops, and hence the information registration processing unit 103 deletes the relevant information out of the unauthorized access information table 150.

The unauthorized intrusion response processing unit 109 of the border router 10, based on the search request data 50 given from the information registration processing unit 103, informs the destination host computer, i.e., the victim host computer 30 that there comes to the status of monitoring the illegal party host computer 60 via the IP packet routing unit 100, and, for this purpose, transmits the unauthorized intrusion response data 140 in the form of the packet containing [monitoring of unauthorized access] as a response type.

Figure 12:
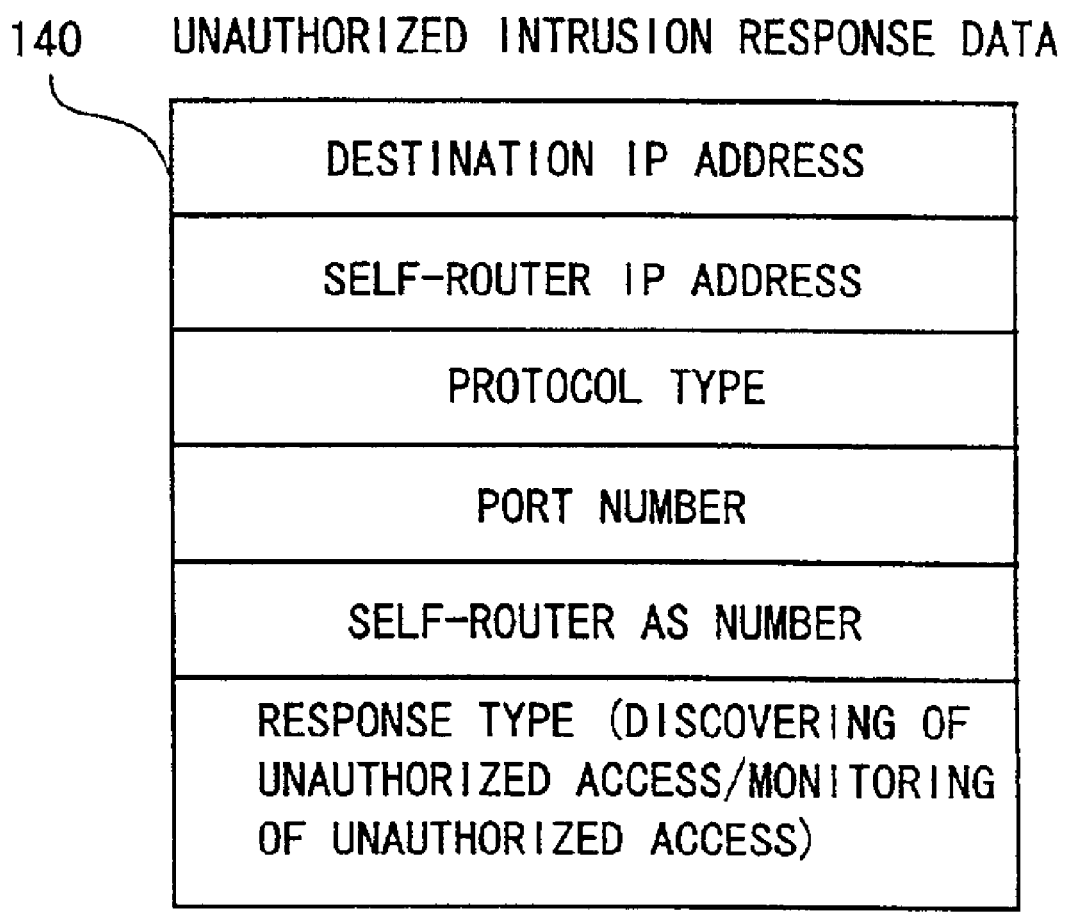
FIG. 12 is an explanatory diagram showing unauthorized intrusion response data.

The unauthorized intrusion response data 140, as shown in FIG. 12, contains a destination IP address, a self-router IP address, a protocol type, a port number and a self-router AS number other than the information such as [discover of unauthorized access] and [monitoring of unauthorized access] as the response types.

After the information registration processing unit 103 has completed registering the illegal party access information table 150 with the unauthorized access information 80 used for implementing the monitoring of the unauthorized access, the destination search processing unit 102 searches a border router information table 151, and reads an unauthorized access information notifying destination (border router IP address) This border router information table 151 is, as shown in FIG. 9, registered with border router information 152 such as the IP address of the border router RT1 within the same autonomous system AS00 and so on. All the destination border routers RT1 are notified of the search request data 50 via a trace request information distribution processing unit 101,the IP packet relay unit 100 and the port 107.

Herein, the trace request information distribution processing unit 101 updates the destination router IP address and the self-router IP address among pieces of search request data 50 received from the destination search processing unit 102 into the obtained border router IP address and self border router IP address. Further, the trace request information distribution processing unit 101 repeats the process of recording the updated search request data 50 a number of times corresponding to an obtained address count.

The border router information 152 can be set by the command 160 in the border router information table 151, however, it is time-consuming to set the border router information 152 in all other border routers RT1 within the autonomous system AS00. Therefore, a border router information transmission/receipt processing unit 105 periodically exchanges the border router information 152 with other border routers RT1.

With the processing described above, the unauthorized access information 80 based on the search request data 50 distributed is set in all the border routers RT1 within the autonomous system AS00 in which the unauthorized intrusion occurs, resulting in a state where the whole autonomous system AS00 is brought under the monitoring of the unauthorized intrusion.

(Process Executed When Monitoring Unauthorized Access Packet in Border Router)

Figure 20:
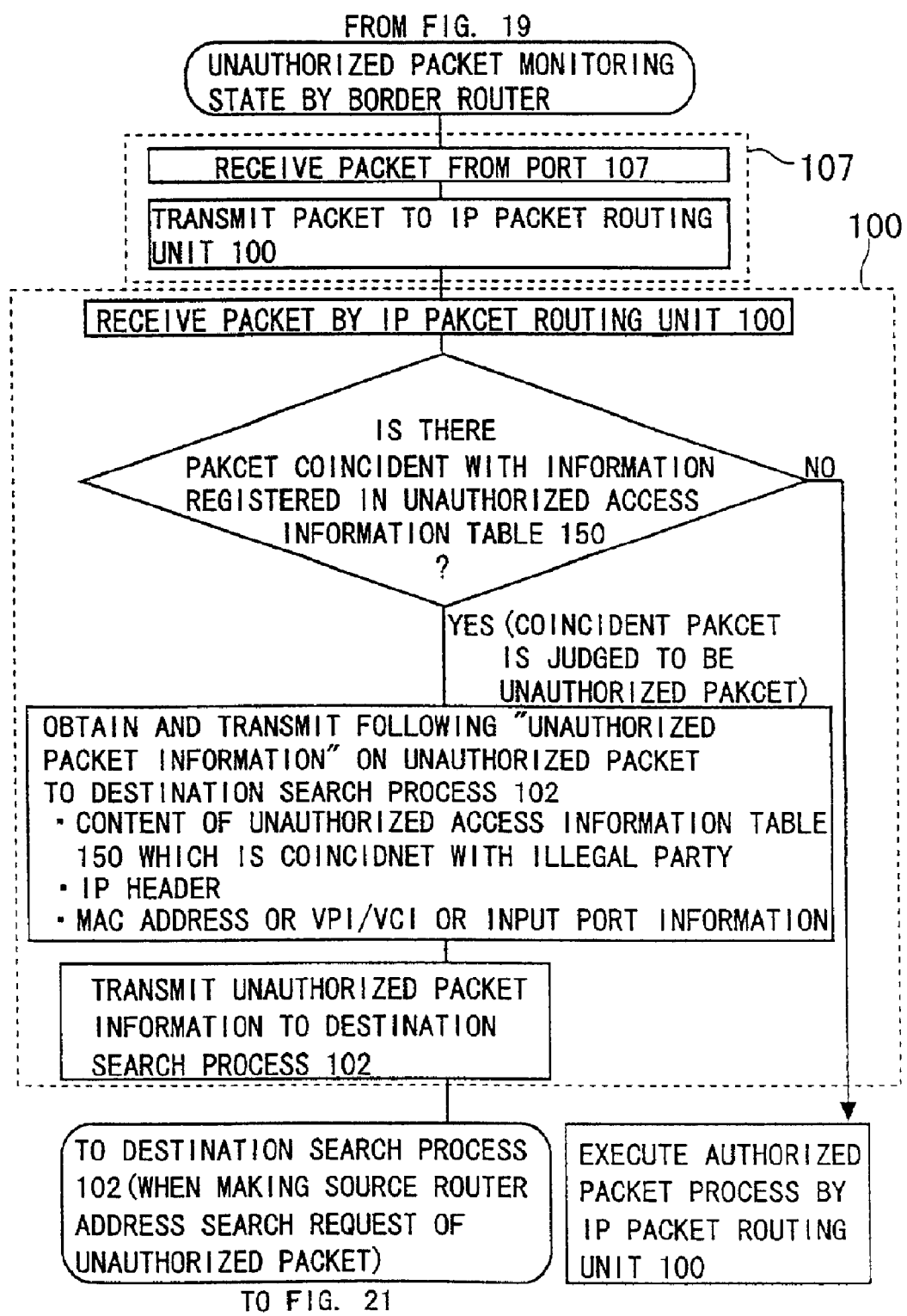
FIG. 20 is a flowchart showing processes executed when monitoring the unauthorized packet in the border router.
Figure 21:
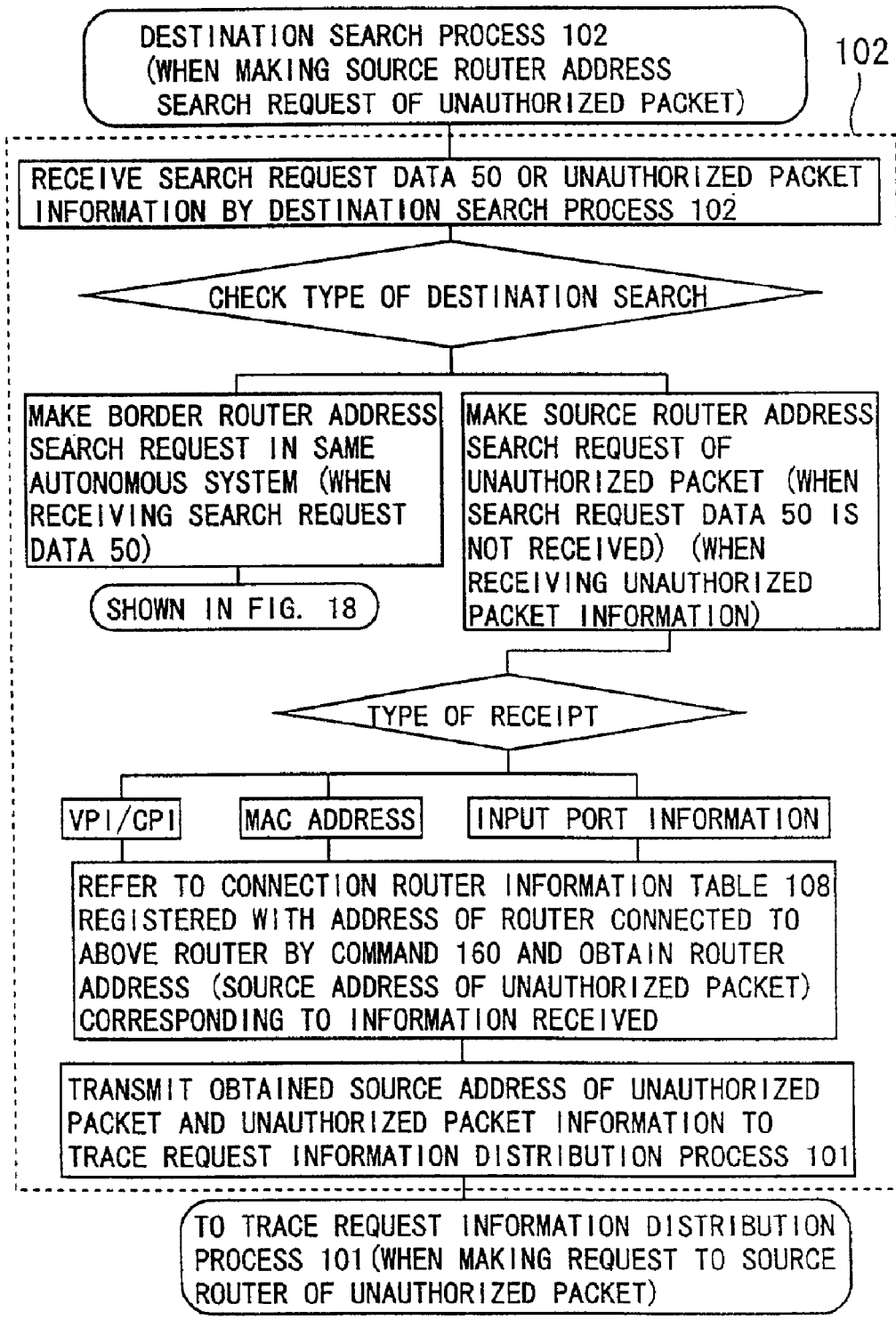
FIG. 21 is a flowchart showing processes executed when monitoring the unauthorized packet in the border router.
Figure 22:
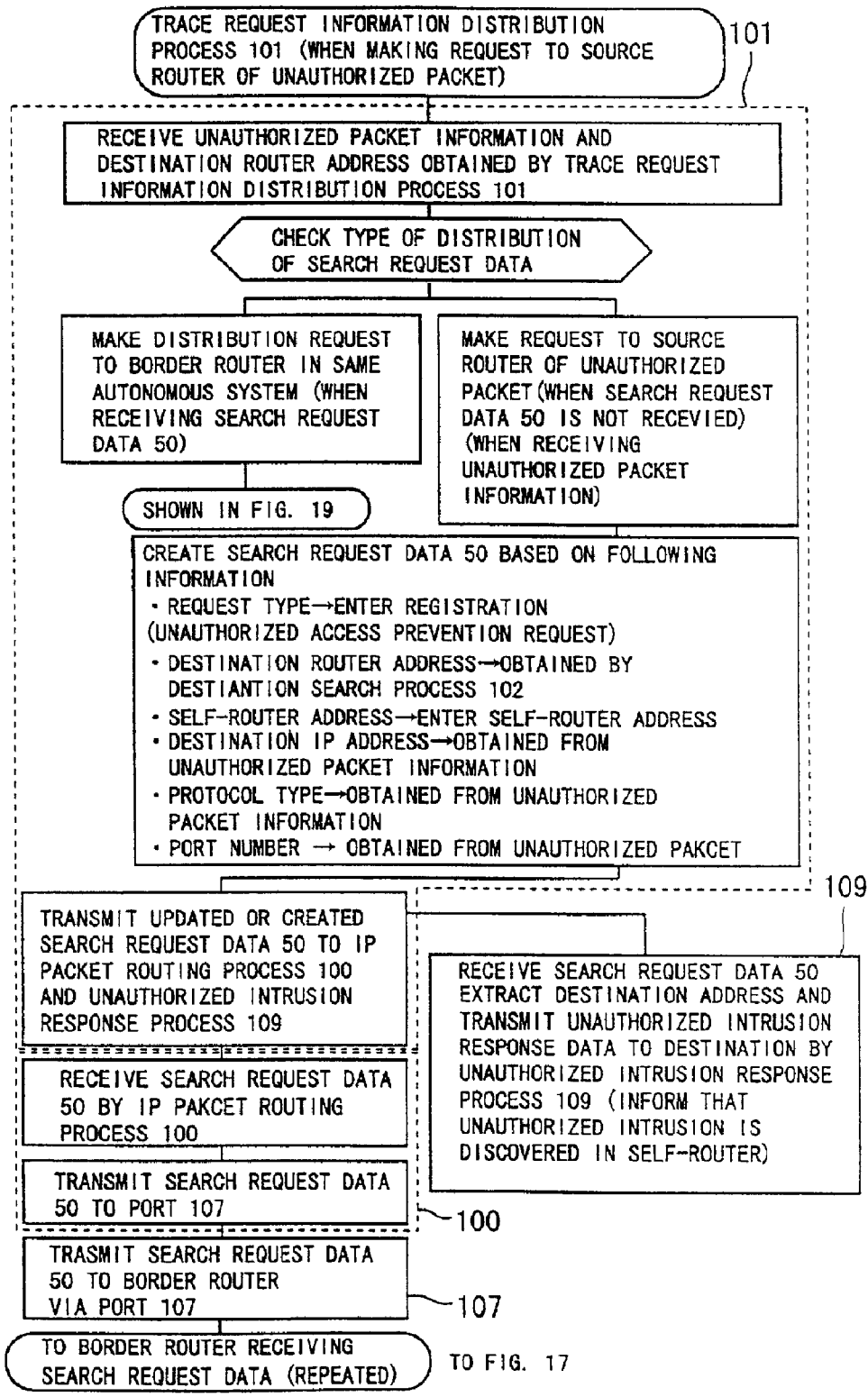
FIG. 22 is a flowchart showing processes executed when monitoring the unauthorized packet in the border router.

FIGS. 20, 21 and 22 show processing steps when monitoring the unauthorized access packet in the border router.

In this state, if there occurs a further unauthorized access via the border router 40 in the autonomous system AS01, the unauthorized access IP packet from the illegal party host computer 60 is forwarded to the IP packet routing unit 100 via the port 107 of the border router 10.

The IP packet routing unit 100 refers to the unauthorized access information table 150 and thus confirms whether or not an inputted IP packet is coincident with the unauthorized access packet coming from the illegal party host computer 60. Herein, the packet is the unauthorized access packet coming from the illegal party host computer 60, and therefore it coincides with the content registered.

Figure 11:
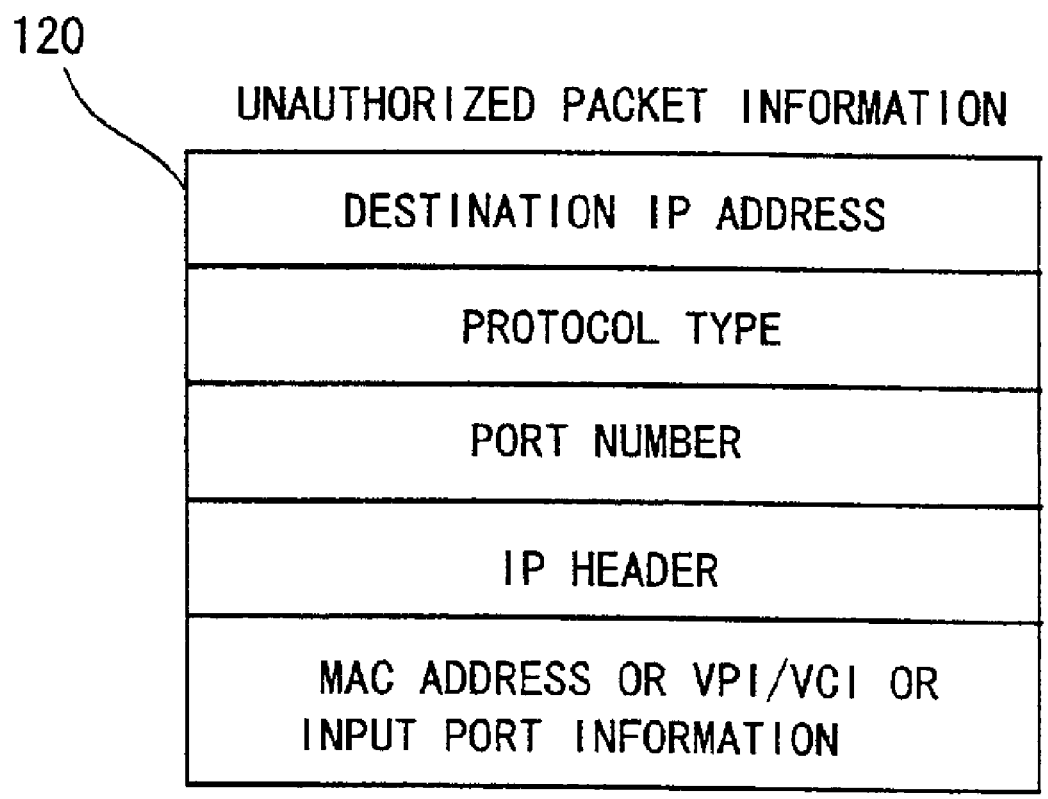
FIG. 11 is an explanatory diagram showing unauthorized packet information.

The IP packet routing unit 100, based on the IP packet received from the border router 40 and the unauthorized access information 80 registered in the unauthorized access information table 150, creates unauthorized packet information 120 containing the information shown in FIG. 11, and transmits the data 120 to the destination search processing unit 102 of the unauthorized intrusion monitor 180.

The destination search processing unit 102 refers to the unauthorized packet information 120 and connection router information 90 (see FIG. 10) in a connection router information table 108 in order to analyze which router the unauthorized access packet comes from, thereby obtaining an IP address of the coincident adjacent router (which is the IP address of the unauthorized access packet source router).

Note that the connection router information 90 is previously registered as information on the adjacent router connected to the self-router by the command 160 in the connection router information table 108.

The trace request information distribution processing unit 101 creates, based on the IP address obtained from the destination search processing unit 102 and on the unauthorized packet information 120, the search request data 50 addressed to the border router 40 to which it should be distributed. The thus created search request data 50 is transmitted to the border router 40 via the IP packet routing unit 100 and the port 107.

The trace request information distribution processing unit 101 simultaneously informs the victim host computer 30 corresponding to the destination host computer that the unauthorized access packet is discovered in the border router 10, and for this purpose transmits the unauthorized intrusion response data 140 (see FIG. 12) indicating [discover of unauthorized access] as a response type via the IP packet routing unit 100 from the unauthorized intrusion response processing unit 109.

The border router 40 in the autonomous system AS01 repeats the processes described above, thereby pinpointing the illegal party, i.e., the host computer 60 in the self IP network.

If the search request data 50 eventually reaches the host computer 60 where the illegal party exists, more precisely, the computer 60 related to the terminal device manipulated by the illegal party, the illegal party host computer 60 makes a judgement about the illegal party as in the case of the router, and transmits the information on the illegal party to the victim host computer 30 corresponding to the destination IP address in the search request data 50.

After the illegal party has been pinpointed and eliminated, it is required that the autonomous systems AS00, AS01 in the whole IP network be indicated to cancel the registration. The registration is canceled normally depending on the monitoring period (time) described above in the respective border routers 10, 40, RT1. The related information may also be deleted from the unauthorized access information table 150 by transmitting a canceling request to the border router 10 with a command 161.

The unauthorized intrusion response data 140 transmitted from each of the border routers 10, 40, RT1 is received by an unauthorized intrusion monitor response accept processing unit 304 via the IP packet forwarding/receiving unit 300 of the victim host computer 30 suffering from the illegal act, and an unauthorized intrusion monitoring state display processing unit 305 is then booted.

Note that the unauthorized intrusion monitor response accept processing unit 304 and the unauthorized intrusion monitoring state display processing unit 305, configure the unauthorized intrusion monitor display unit 360 of the victim host computer 30 shown in FIG. 4.

The unauthorized intrusion monitoring state display processing unit 305 extracts an AS number and a router address out of the unauthorized intrusion response data 140 received, and displays an unauthorized intrusion monitoring state as shown in FIG. 14 on the unauthorized intrusion monitor display unit 360.

In the unauthorized intrusion monitoring state display example shown in FIG. 14, the victim is the host computer (IP address: 111.10.12.44) 30 marked with ⊙ in the autonomous system corresponding to an AS number [111], while the illegal party terminal device (IP address: 10.34.210.75) 60 marked with ☆ in the autonomous system having an AS number [2510].

Further, a mark ● in each autonomous system represents a border router with [discover of unauthorized access], and a mark ○ indicates a border router with [on-monitoring of unauthorized access].

As discussed above, in the IP communication network system SYS in one embodiment of the present invention, the unauthorized access packet of the illegal party, which intrudes the host computer 30 in the autonomous system AS00 from the IP network such as the Internet, is detected by the unauthorized intrusion monitor 180 of the border router 10, and other border routers RT1 in the same autonomous system AS00 are notified of this detection.

In the border router 10, the unauthorized access information is registered directly in the unauthorized access information table 150 of the self border router, and, when re-intruded, a source common carrier (provider) can be pinpointed at the high speed. The border router information table 151 is registered with the IP addresses of the border routers 10, RT1 within the autonomous system AS00. The information (the search request data 50) on the illegal party is distributed to those IP addresses, thereby making it feasible to attain a speed-up of pinpointing the illegal party. Further, the autonomous system AS00 can be safeguarded on the network basis from the intrusion of the unauthorized packet, and hence it is possible to prevent the increase in traffic increase due to the unauthorized access packets.

Each of the border routers 10, RT1 has the unauthorized access information table 150. If the re-intrusion of the unauthorized packet occurs, this is compared with unauthorized access information 80 in the unauthorized access information table 150, and, if it is judged that this packet comes from an intruder coincident with the content of the information 80, the search request data 50 is distributed to the source router (RT1) 40. With a repetition of this operation, if traced back to the router (RT1) 40 most proximal to the illegal party, this router 40 executes a shut-off process, whereby the access of the illegal party can be shut off.

Moreover, all other border routers RT1 within the autonomous system AS00 where the victim host computer 30 exists are notified of the information, and hence, even when the route is changed, the search can be promptly started.

Modified Example

In the IP communication network system in one embodiment discussed above, if the illegal party (the host computer and terminal device of the illegal party) and the victim (the victim host computer) exist in the same autonomous system, the illegal party can be similarly pinpointed by providing the relay router having the function of the border router described above inwardly of the autonomous system.

In this case, the routers connected to the self-router are registered in the border router information table and in the connection router information table in each relay router in the autonomous system.

The victim host computer having the detected the illegal act transmits the search request data to the border routers and also to the relay router connected to the self victim host computer. An illegal party pinpointing algorithm based on the relay router is the same as the illegal party pinpointing algorithm based on the border router.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. An IP communication network system:

comprising a plurality of autonomous systems, configuring IP networks of domains independent of each other, for performing interior- and exterior-forwarding of IP packets, said plurality of autonomous systems including a plurality of border relay devices positioned at borders between the IP networks, each of said plurality of border relay devices including:

a discarding unit for discarding, if the IP packet forwarded is an unauthorized intrusion packet, this unauthorized packet when detecting a re-intrusion on the basis of filtering information, having at least one of the destination IP address, protocol type and port number of the unauthorized packet, for detecting the re-intrusion of the unauthorized packet;

a registration processing unit having a monitoring time for detecting the re-intrusion of the unauthorized packet with respect to each of the unauthorized packets and deleting, upon the monitoring time corresponding to the unauthorized packet expiring, the information of the unauthorized packet from the filtering information; and a distribution unit for distributing the filtering information to all other border relay devices within said same autonomous system.

2. An IP communication network system according to claim 1, wherein a host computer of each of said plurality of autonomous systems includes a detection unit for detecting based on predetermined items of judging information that the IP packet forwarded is the unauthorized intrusion packet.

3. An IP communication network system according to claim 1, wherein said distribution unit of said border relay device further distributes the filtering information to one of other border relay devices within one of other autonomous systems from which the unauthorized packet is forwarded.

4. An IP communication network system according to claim 1, wherein each of a plurality of relay devices positioned at relay points between the respective IP networks of said plurality of autonomous systems includes:

a discarding unit for discarding, if the IP packet forwarded is an unauthorized intrusion packet, this unauthorized packet when detecting a re-intrusion on the basis of filtering information, having at least one of the destination IP address, protocol type and port number of the unauthorized packet, for detecting the re-intrusion of the unauthorized packet;

a registration processing unit having a monitoring time for detecting the re-intrusion of the unauthorized packet with respect to each of the unauthorized packet and deleting, upon the monitoring time corresponding to the unauthorized packet expiring, the information of the unauthorized packet from the filtering information; and a distribution unit for distributing the filtering information to all said relay devices within said same autonomous system.

5. A border relay device positioned at a border between autonomous systems, configuring IP networks of independent domains, for performing interior-and exterior- forwarding of an IP packet, said border relay device comprising:

a discarding unit for discarding, if the IP packet forwarded is an unauthorized intrusion packet, this unauthorized packet when detecting a re-intrusion on the basis of filtering information, having at least one of the destination IP address, protocol type and port number of the unauthorized packet, for detecting the re-intrusion of the unauthorized packet;

a registration processing unit having a monitoring time for detecting the re-intrusion of the unauthorized packet with respect to each of the unauthorized packet and deleting, upon the monitoring time corresponding to the unauthorized packet expiring, the information of the unauthorized packet from the filtering information; and a distribution unit for distributing the filtering information to all other border relay devices within said autonomous systems.

6. A border relay device according to claim 5, wherein said distribution unit further distributes the filtering information to one of other border relay devices positioned at a border within one of other autonomous systems from which the unauthorized packet is forwarded.

7. An unauthorized intrusion safeguard method in an IP communication network system having a plurality of autonomous systems, configuring IP networks of independent domains of each other, for performing interior- and exterior-forwarding of IP packets, said method in each of said plurality of autonomous systems, comprising:

detecting that the IP packet forwarded is an unauthorized intrusion packet on the basis of predetermined items of judging information;

discarding the unauthorized packet at one border of the IP network when detecting a re-intrusion on the basis of filtering information, having at least one of the destination IP address, protocol type and port number of the unauthorized packet, for detecting the re-intrusion of the unauthorized packet;

deleting, upon the monitoring time corresponding to the unauthorized packet expiring, the information of the unauthorized packet from the filtering information; and distributing the filtering information to all other border relay devices within said same autonomous system.

8. An unauthorized intrusion safeguard method according to claim 7, further comprising:

distributing the filtering information to the border within one of other autonomous systems from which the unauthorized packet is forwarded.

9. An unauthorized intrusion safeguard method according to claim 7, further, in each of said plurality of autonomous systems, comprising:

discarding, when the IP packet forwarded is an unauthorized intrusion packet, the unauthorized packet at one border of the IP network when detecting a re-intrusion on the basis of filtering information, having at least one of the destination IP address, protocol type and port number of the unauthorized packet, for detecting the re-intrusion of the unauthorized packet;

deleting, upon the monitoring time corresponding to the unauthorized packet expiring, the information of the unauthorized packet from the filtering information; and distributing the filtering information to all other relay points within said same autonomous system.

10. An authorized intrusion safeguard method comprising:

discarding, if an IP packet forwarded is an unauthorized intrusion packet, this unauthorized packet when detecting a re-intrusion on the basis of filtering information, having at least one of the destination IP address, protocol type and port number of the unauthorized packet, for detecting the re-intrusion of the unauthorized packet at a border between autonomous systems, configuring IP networks of independent domains, for performing interior- and exterior-forwarding of the IP packet;

deleting, upon the monitoring time corresponding to the unauthorized packet expiring, the information of the unauthorized packet from the filtering information; and distributing the filtering information to all other borders within said autonomous systems.

11. An authorized intrusion safeguard method according to claim 10, further comprising:

distributing the filtering information to a border within one of other autonomous systems from which the unauthorized packet is forwarded.

* * * * *